United States Patent
Balin et al.

(10) Patent No.: US 12,490,101 B2
(45) Date of Patent: Dec. 2, 2025

(54) EXTENDED ROOT OF TRUST VALIDATION FOR REMOTE EDGE DEVICES

(71) Applicant: Dell Products L.P., Round Rock, TX (US)

(72) Inventors: Maxim Balin, Gan-Yavne (IL); Shree Rathinasamy, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 324 days.

(21) Appl. No.: 18/471,619

(22) Filed: Sep. 21, 2023

(65) Prior Publication Data

US 2025/0106638 A1   Mar. 27, 2025

(51) Int. Cl.
*H04W 12/71* (2021.01)
*H04W 12/082* (2021.01)

(52) U.S. Cl.
CPC ......... *H04W 12/71* (2021.01); *H04W 12/082* (2021.01)

(58) Field of Classification Search
CPC .............................. H04W 12/71; H04W 12/082
See application file for complete search history.

(56) References Cited

U.S. PATENT DOCUMENTS

| | | | | |
|---|---|---|---|---|
| 2015/0007262 A1* | 1/2015 | Aissi | ................. | G06F 21/60 726/2 |
| 2015/0074745 A1* | 3/2015 | Stern | ................. | G06F 21/57 726/1 |
| 2019/0036906 A1* | 1/2019 | Biyani | ................. | H04L 63/102 |
| 2019/0319807 A1* | 10/2019 | Fairfax | ................. | H04L 9/3247 |
| 2020/0042709 A1* | 2/2020 | Fu | ................. | G06F 9/4401 |

OTHER PUBLICATIONS

St. Clair et al., "Establishing and Sustaining System Integrity via Root of Trust Installation", Dec. 2007, Twenty-Third Annual Computer Security Applications Conference, pp. 19-29 (Year: 2007).*
Fang et al., "Research and application of trusted computing platform based on portable TPM", Aug. 2009, 2nd IEEE International Conference on Computer Science and Information Technology, pp. 506-509 (Year: 2009).*

* cited by examiner

*Primary Examiner* — Kenneth W Chang
(74) *Attorney, Agent, or Firm* — WOMBLE BOND DICKINSON (US) LLP (57) ABSTRACT

Methods and systems for managing operation of endpoint devices are disclosed. The operation of the endpoint devices may be managed by requiring that the endpoint devices obtain security data from other devices. If the security data is not obtained, the endpoint devices may seal at least some of their functions from use by users. By limiting the functions of the endpoint devices, malicious parties may be less likely to be able to compromise the endpoint devices. The endpoint devices and other devices may be operably connected via a channel that limits that distance between the endpoint devices and the other devices. If the distance is exceeded, then the endpoint devices may be deprived of access to the security data.

20 Claims, 6 Drawing Sheets

EXTENDED ROOT OF TRUST VALIDATION FOR REMOTE EDGE DEVICES

FIELD

Embodiments disclosed herein relate generally to device management. More particularly, embodiments disclosed herein relate to systems and methods to secure devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing services using endpoint devices. To provide services using endpoint devices, the endpoint devices may host various pieces of software, may be configured in certain manners, and/or may be adapted to provide the computer implemented services in various ways.

During operation, the endpoint devices may be subjected to various threats. For example, the endpoint devices may be part of edge infrastructure. Edge infrastructure may be installed in environments where little physical security of the endpoint devices is in place.

To reduce the likelihood of compromise of the endpoint devices due to the threats, the end point devices may implement a security framework that requires that security data required for root of trust validation be distributed to another device. During startups and at other points in time, the security data may need to be accessed to complete root of trust validation.

The other device and endpoint devices may be connected via a channel that limits the distance to which the endpoint devices may be removed from the other device. Consequently, should an endpoint device be removed from vicinity to the other device, then the endpoint devices may lose access to the security data. Accordingly, the endpoint devices may be able to complete root of trust validations.

When a root of trust validation is incomplete, various remedial actions may be performed. The remedial actions may limit functionality of the endpoint device. For example, some functions of the endpoint devices may be sealed. Consequently, the endpoint devices may be less likely to be compromised by removing the ability for these functions to be used. Accordingly, even if an endpoint device is physically compromised, the operation of the endpoint device may resist compromise by prevent use of various functions.

Thus, embodiments disclosed herein may address, among others, the technical problem of security in a distributed system. By limiting the functionality of endpoint devices while out of range of other devices, the endpoint devices may be less likely to be compromised even if stolen or otherwise physically interacted with by malicious parties.

In an embodiment, a method for managing operation of endpoint devices of a deployment is provided. The method may include initiating validation of a root of trust during a startup of an endpoint device of the endpoint devices; during the validating of the root of trust, identifying security data required to complete the validating of the root of trust; requesting, via an optical wireless communication channel, that a security manager provide access to the security data; making a determination regarding whether the security data has been provided responsive to the requesting; in a first instance of the determination where the security data has not been provided: sealing at least a portion of functionality of the endpoint device from future use by users of the endpoint device.

The method may also include in a second instance of the determination where the security data has been provided: completing validation of the root of trust to obtain a validated root of trust and completing the startup using the validated root of trust to maintain access to the at least the portion of the functionality of the endpoint device.

The at least the portion of the functionality of the endpoint device may be sealed by a trusted platform module of the endpoint device, the trusted platform module preventing use of the at least one secret by the endpoint device while the at least a portion of the functionality is sealed.

The security manager may include a LiFi recorder adapted to communicate with the endpoint device while the endpoint device is within a distance to the security manager and the security manager has an unobstructed line of sight to the endpoint device.

The optical wireless communication channel may operably connect the LiFi recorder and the endpoint device while the endpoint device is within the distance to the security manager and the security manager has an unobstructed line of sight to the endpoint device.

Sealing the at least a portion of functionality of the endpoint device from future use by users of the endpoint device may include measuring, by a trusted platform module, a register in which the security data is to be stored when received from the security manager; and concluding, by the trusted platform module, that the endpoint device is in an unsecured state based on the measuring. The trusted platform module may enter a sealed state when the endpoint device is in the unsecured state.

The security data may include a signature verifiable using a key stored in a database protected by the trusted platform module.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may initiate performance the computer-implemented method when the computer instructions are executed by the processor.

Figure 1:
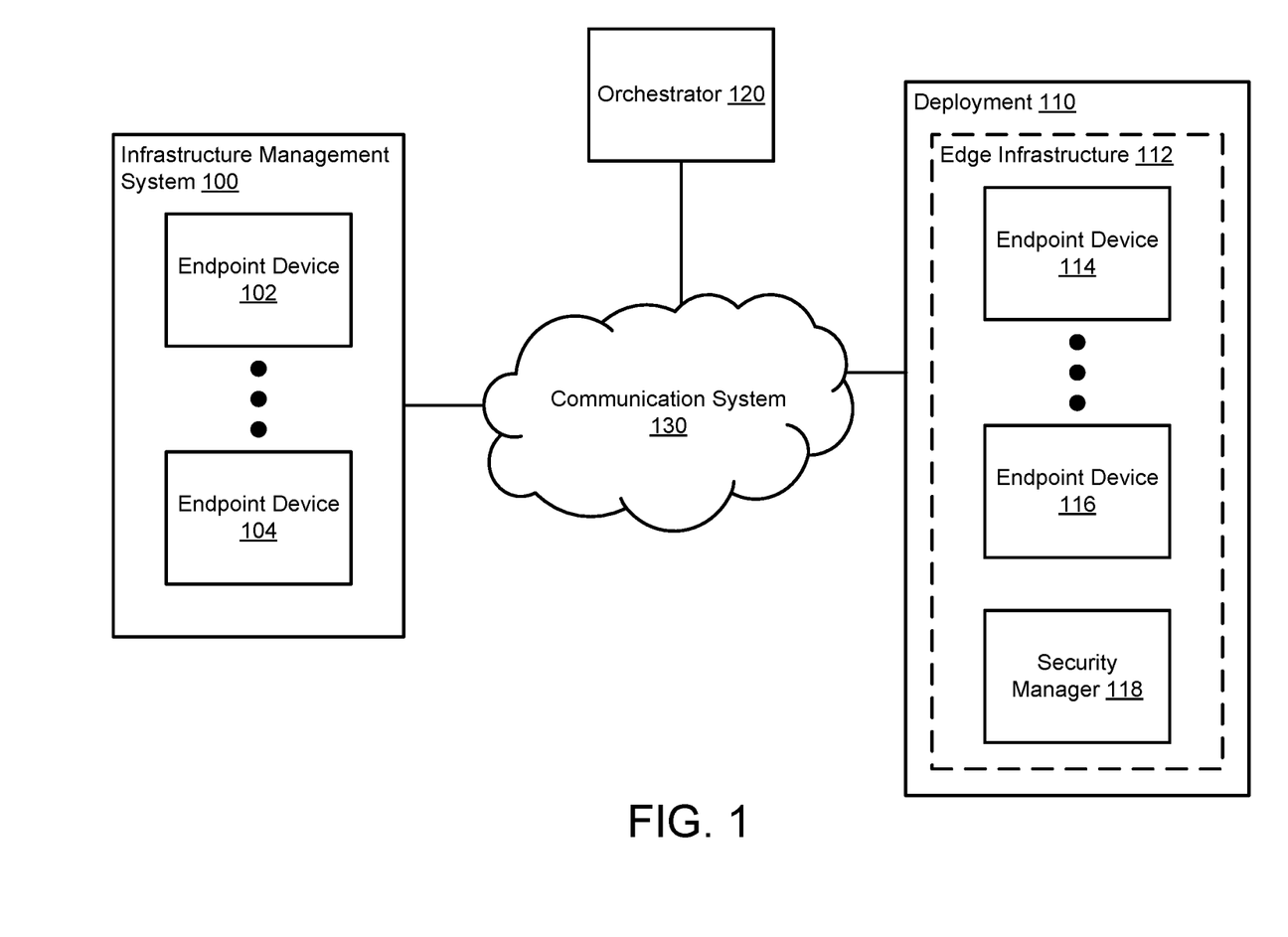
FIG. 1 shows a block diagram illustrating a system in accordance with an embodiment.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, transaction processing services, and/or any other type of service that may be implemented with a computing device.

To provide the computer implemented services, the system may include deployment 110. Deployment 110 may edge infrastructure 112 which may include any number of endpoint devices (e.g., 114, 116). The endpoint devices may cooperatively and/or individually provide all, or a portion of the computer implemented services.

To contribute to the computer implemented services, the endpoint devices may host certain software, may be configured in certain manners (e.g., network communication configurations, software/hardware configurations, etc.), and/or may otherwise be modified to meet one or more requirements to contribute to the computer implemented services. Further, groups of endpoint devices may be modified to cooperatively provide various services. For example, some endpoint devices of a group may host some software to provide some functions while other endpoint devices of a group may host different software to provide other functions which, in aggregate, allow desired computer implemented services to be provided.

However, due to the placement of endpoint devices (e.g., at an edge installation) and the resources of the endpoint devices, the endpoint devices may be more susceptible to malicious activity. For example, any of the endpoint devices may be part of an edge installation (e.g., 112) which may subject the endpoint devices to physical attacks (e.g., malicious devices may be operably connected to the endpoint devices by attaching the malicious device to a port of a network interconnecting the endpoint devices), network attacks (e.g., networks that support operation of the edge installation may include fewer security mechanisms than would be present in other computing environments such as data centers), and/or the endpoint device may be subject to more vectors of attack for other reason when compared to computing devices located in other computing environments.

In general, embodiments disclosed herein may provide methods, systems, and/or devices for managing the operation of edge infrastructure. To manage the edge infrastructure, a security framework for edge devices of the edge infrastructure may be enforced. The security framework may require that an endpoint device to obtain security data for continued operation of the endpoint device.

To limit the operation of the endpoint device, the security data may be integrated into a root of trust for the endpoint device. For example, access to the security data may be required for various functionalities of the endpoint device to be unlocked. These functionalities may include use of secrets managed by trusted platform modules of the endpoint devices.

To obtain the security data, and endpoint device may be required to interact with another device. The other device may maintain the security data and provide it when an endpoint device validates itself to the other device.

The endpoint device and the other device may be operably connected to one another via a communication link that depends on physical proximate and line of sight for operation. For example, the communication link may be implemented with an optical communication system such as LiFi. Consequently, if an endpoint device is not in physical proximity to, line of sight with, or unable to authenticate itself to the other device, then the endpoint device may be unable to access the security data thereby depriving it of some or all of its functionality. Accordingly, physically attacks on the endpoint devices may be less likely to result in compromise of data or the endpoint devices themselves due to the lack of functionality imposed by lack of access to the security data.

By doing so, embodiments disclosed herein may provide a system that is more likely to provide desired computer implemented services by reducing the likelihood of members of the system being compromised.

To provide the above noted functionality, the system of FIG. 1 may include infrastructure management system 100, deployment 110, orchestrator 120, and communication system 130. Each of these components is discussed below.

Infrastructure management system 100 may facilitate management of deployment 110. Infrastructure management system 100 may include any number of data processing systems (e.g., 102, 104). The data processing systems may be used by administrators and/or other persons that manage deployment 110 to provide desired computer implemented services.

Orchestrator 120 may manage deployment 110. To manage deployment 110, orchestrator 120 may present interfaces to users of data processing systems 102-104 of infrastructure management system 100. The interfaces may allow privileged users (e.g., administrators, etc.) to enforce security frameworks by, for example, deploying security data and establishing requirements for access to the security data in endpoint devices 114-116.

Deployment 110, as noted above, may provide computer implemented services. To provide the computer implemented services, the endpoint devices of deployment 110 may implement the security framework discussed above.

The security framework may require that each endpoint device (i) gain access to security data managed by a security manager (e.g., 118) during startups, (ii) use the security data to validate a root of trust for each endpoint device, and (iii) if the root of trust is unable to be validated, seal secrets and/or take other action to limit the functionality of the endpoint device. After security data is obtained and used to verify a root of trust, the security data may be discarded and/or expire so that it may not be used for future root of trust validation procedures. By requiring that the endpoint devices gain access to the security data to complete startup, continue operation, and/or use the security data for other purposes, endpoint devices 114-116 may be less likely to be compromised.

Figure 2A:
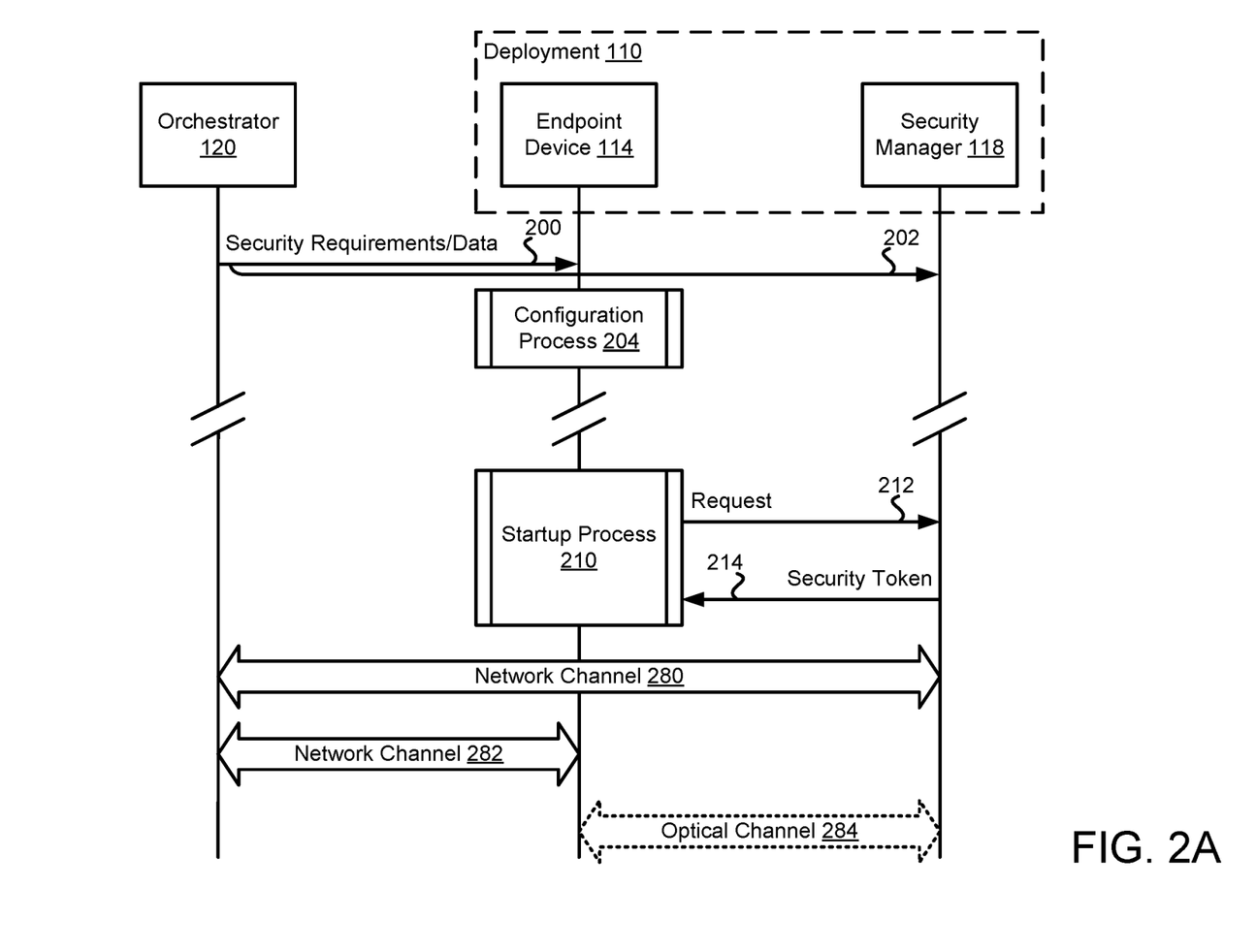
FIGS. 2A-2C show interaction flow diagrams in accordance with an embodiment.
Figure 2B:
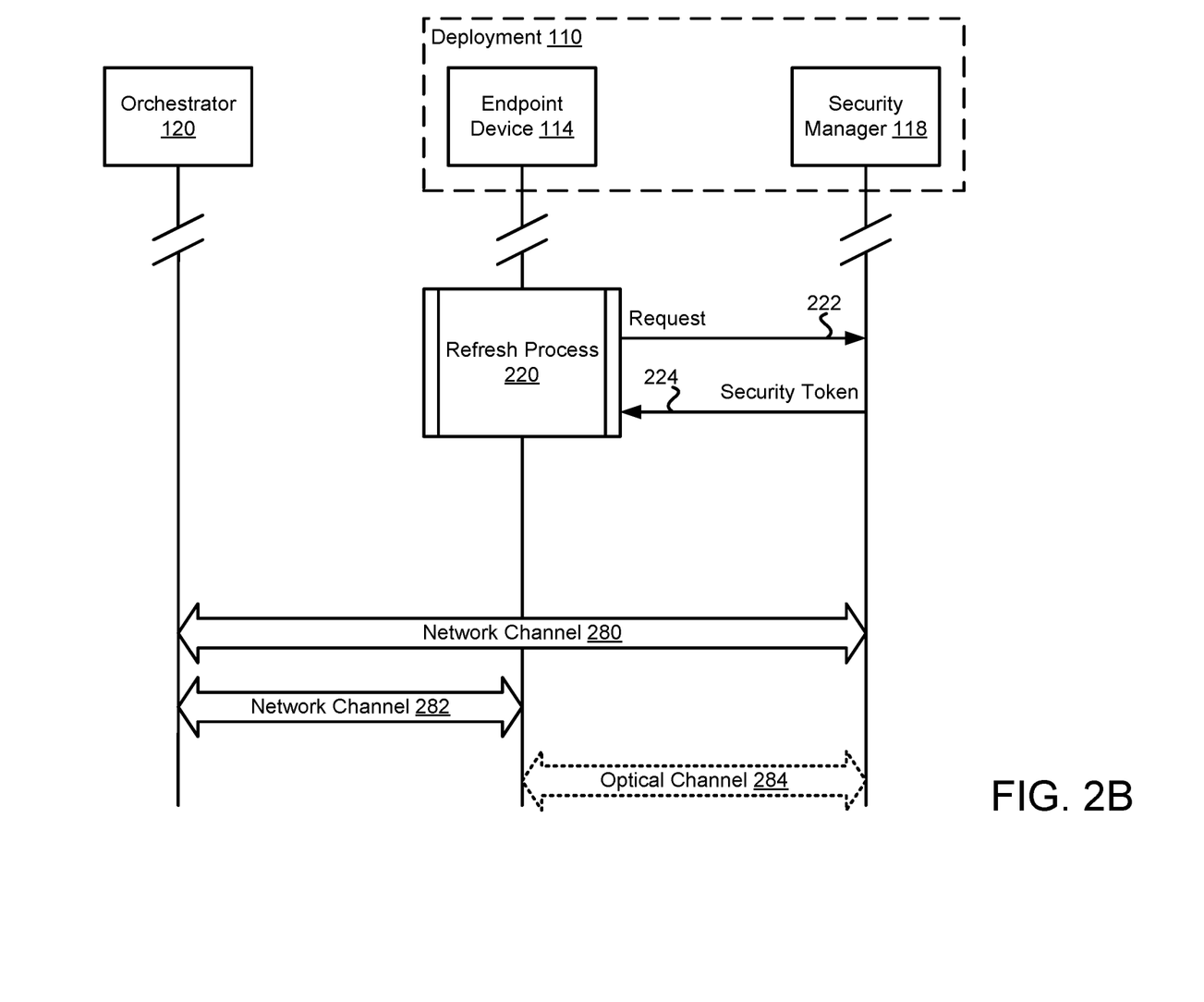
Figure 2C:
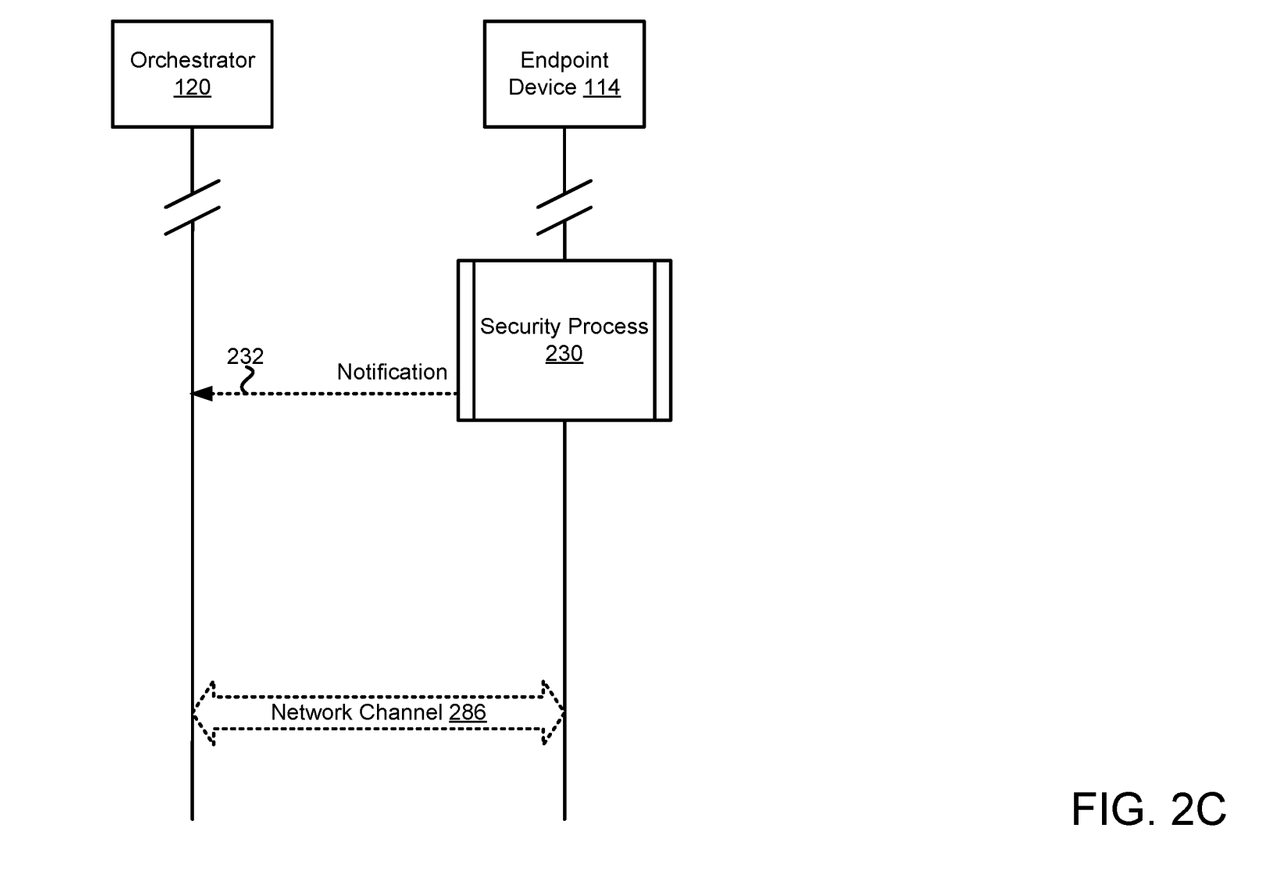

To gain access to the security data, each endpoint device may include an optical transceiver to communicate with a security manager via an optical wireless channel. The optical wireless channel may conform to the LiFi or other free space optical communication standard. The LiFi standard may, for example, encode data on modulated visible light. The optical wireless channel may be used in conjunction with and/or separately from other communication channels. Refer to FIGS. 2A-2C for additional details regarding communication channels.

Security manager 118 may store and provide copies of security data to any of endpoint devices 114-116. For example, security manager 118 may include a LiFi recorder which may store and provide security data to requesting data processing systems. Prior to providing the security data, security manager 118 may validate a requesting device.

For example, security manager 118 may issue a challenge and require that a compliant response (e.g., a copy of the challenge signed using a trusted key) be provided by the requestor. If the compliance response is provided, then security manager 118 may treat the requestor as being authenticated.

Like endpoint devices 114-116, security manager 118 may include an optical transceiver to communicate and may implement various communication protocols (e.g., optical, wired/wireless, etc.). Thus, the security data may be distributed to the endpoint devices via optical communications with may be range and line of sight limited thereby rendering the endpoint devices inoperable if out of range/line of sight of security manager 118.

While illustrated in FIG. 1 with respect to a single security manager, deployment 110 may include any number of security managers that may provide cooperate with different groups of endpoint devices. The number and groupings may be selected based on the physical topology of the distribution of endpoint devices 114-116 within an environment.

Figure 3:
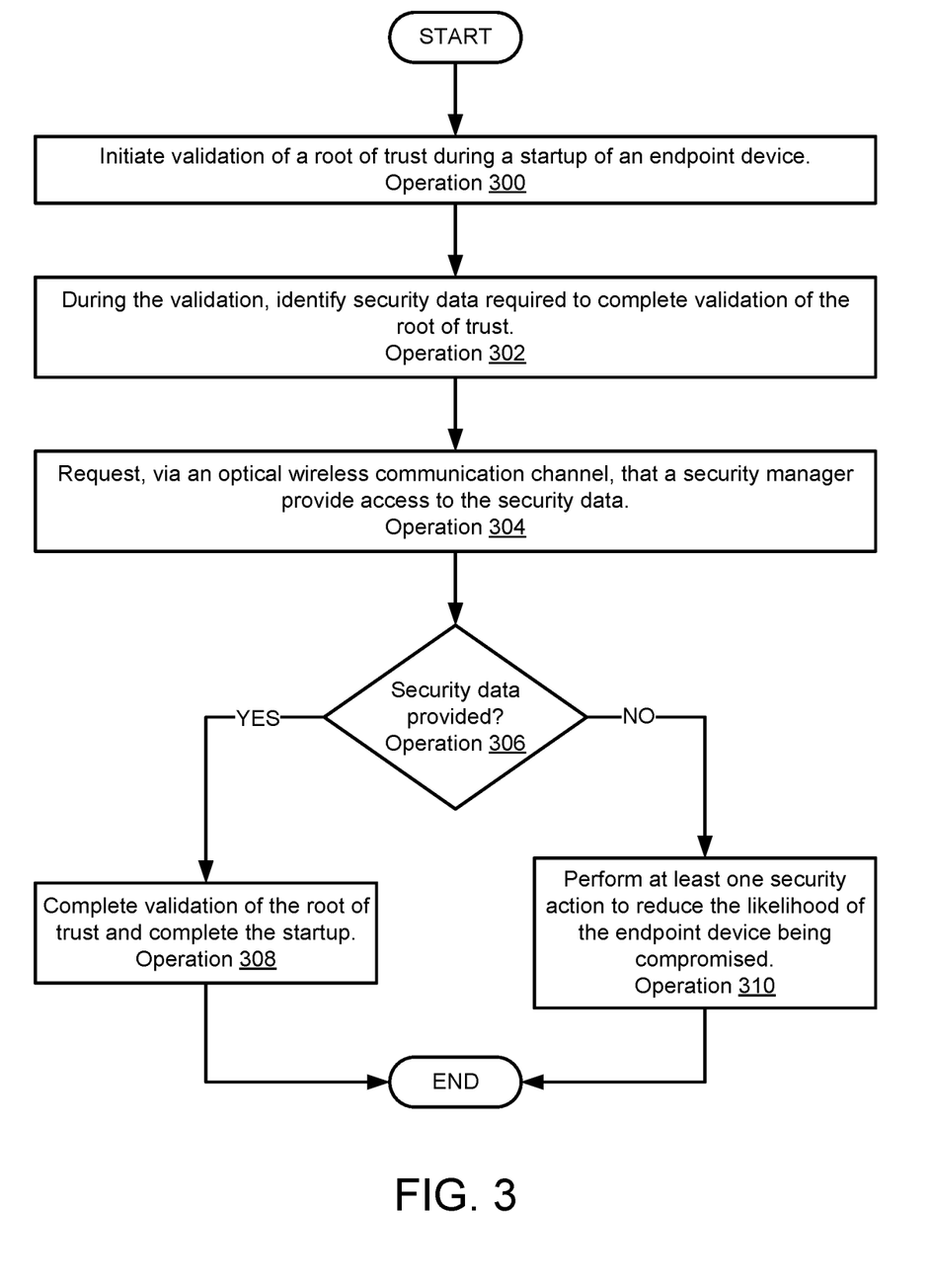
FIG. 3 shows a flow diagram illustrating a method in accordance with an embodiment.

When providing their functionality, any of (and/or components thereof) infrastructure management system 100, deployment 110, and/or orchestrator 120 may perform all, or a portion, of the actions and methods illustrated in FIGS. 2A-3.

Any of (and/or components thereof) infrastructure management system 100, deployment 110, and orchestrator 120 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 130. In an embodiment, communication system 130 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, interactions diagrams in accordance with an embodiment are shown in FIGS. 2A-2C. These interactions diagrams may illustrate how data may be obtained and used within the system of FIG. 1.

In the interaction diagrams, processes performed by and interactions between components of a system in accordance with an embodiment are shown. In the diagrams, components of the system are illustrated using a first set of shapes (e.g., 114, 120, etc.), located towards the top of each figure. Lines descend from these shapes. Processes performed by the components of the system are illustrated using a second set of shapes (e.g., 204, 210, etc.) superimposed over these lines. Interactions (e.g., communication, data transmissions, etc.) between the components of the system are illustrated using a third set of shapes (e.g., 200, 212, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 200 may occur prior to the interaction labeled as 212. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate processes and interactions that may occur to secure endpoint devices of a deployment.

To secure the endpoint devices, at interactions 200-202, orchestrator 120 may provide security requirements to endpoint devices (e.g., 114) of deployment 110, and security data usable to satisfy the security requirements to security manager 118. The security data may include a key usable to sign data structures and/or a key usable to complete a root of trust validation (or other security check activity) by an endpoint device.

For example, the security requirements provided to endpoint device 114 may specify: (i) that a security token must be obtained from security manager 118 during a startup for the startup to be completed, (ii) that the security token must be verifiable (e.g., by verifying a signature in the token using a trusted key), (iii) that a payload (e.g., a key) of the security token must be available to complete a root of trust validation by the endpoint device, (iv) that a security token that has not expired be available during operation of endpoint device 114, (v) that the security token available during operation be updated periodically, (vi) that the endpoint device suspend, end, or otherwise change its operation in response to unavailability of security tokens from security manager 118, and/or (vii) that other types of cooperative checks be performed with security manager 118.

The security requirements and security data may be provided using network channel 282 and network channel 280, respectively. These channels may be implemented with wired and/or wireless networks.

To implement the security framework, endpoint device 114 may perform configuration process 204. During configuration process 204, endpoint device 114 may store data regarding the security requirements, may provide information regarding the requirements to platform management modules or other types of security devices to configure their operation (i.e., to enforce the configuration), and/or may perform other actions to implement the security requirements with respect to root of trust validation.

Security manager 118 may similarly store information regarding the security data, may obtain keys usable to validate requests from other devices, and/or may perform other actions to prepare to facilitate validation of roots of trust.

Once configuration process 204 is completed, endpoint device 114 and security manager 118 may be in condition to validate the root of trust for endpoint device 114.

At a future point in time, endpoint device 114 may restart its operation. As part of the restart, startup process 210 may be performed. During startup process 210, endpoint device 114 may perform various validation operations for its root of trust. These validation operations may include, for example, (i) validating databases in which keys or other types of data usable to verify the operation of endpoint device 114 (e.g., may be part of a measurement process performed by a trusted platform module of endpoint device 114), (ii) obtaining and validating security data from security manager 118, and/or (iii) using the security data to validate other data structures stored in endpoint device 114.

To obtain the security data, at interaction 212, endpoint device 114 may send a request to security manager 118 for the security data. The request may be signed with a private key corresponding to a published public key that is trusted by security manager 118. Once obtained, security manager 118 may verify, using the trusted public key, that the request is signed using the corresponding private key (if unable to be verified, then the request may be denied).

Once verified, at operation 214, security manager 118 may provide a security token to endpoint device 114. The request and secure token may be transmitted via optical channel 284. Optical channel may be an optical wireless communication channel, such as a LiFi based point to point communication channel.

The security token may include a payload that is signed using a second private key corresponding to a second public key that is trusted by endpoint device 114 (e.g., the public key may be in an extensible firmware interface (EFI) database that is checked for its integrity during startup process 210 such as part of a secure boot procedure and/or otherwise able to be checked using a root of trust for endpoint device 114). The payload may include, for example, data required for the root of trust to be validated by endpoint device 114. For example, the payload may include a key or other type of cryptographic data structure. The key or other data may be used to complete validation of the root of trust of endpoint device 114.

If the root of trust is unable to be validated, then startup process 210 may be terminated and/or functionality of endpoint device 114 may be limited. For example, a trusted platform module of endpoint device 114 may deny use of secrets maintained by the trusted platform module if the root of trust is not able to be validated.

However, if validated, then the startup process may be completed and functionality of endpoint device 114 may not be restricted at least with respect to for failure to validate the root of trust. Thus, endpoint device 114 may enter a nominal mode of operation. For example, various management entities such as operating systems and drivers may begin operation, and various applications may begin to operate to provide desired computer implemented services.

Turning to FIG. 2B, a second interaction diagram in accordance with an embodiment is shown. The second interaction diagram may illustrate processes and interactions that may occur to continue secure operation of endpoint devices of a deployment.

To continue secure operation of an endpoint device, refresh process 220 may be performed. Refresh process 220 may be performed while endpoint device is operating nominally.

During refresh process 220, endpoint device 114 may attempt to refresh the security token available to it. Refresh process 220 may be performed in accordance with a schedule, in response to security tokens reaching age limits, and/or for other reasons.

To refresh the security token available to endpoint device 114, at interaction 222, a request may be sent to security manager 118. The request may be similar to the request discussed with respect to interaction 212, and may be similarly validated by security manager 118. If validated, security manager 118 may provide another security token to endpoint device 114 at interaction 224.

If the new security token is usable to validate the root of trust for endpoint device 114, then endpoint device 114 may continue to operate nominally. However, if the new security token is unable to validate the root of trust, then various remedial actions may be performed. The remedial actions may include (i) forcing a restart of endpoint device 114, (ii) terminating operation of endpoint device 114, (iii) suspending some functionality of endpoint device 114 such as use of secrets maintained by a trusted platform module, and/or (iv) performing other actions to limit use of endpoint device 114. The other actions may include, for example, disabling software components, disabling hardware components, configuring software components to limit use of some or all functions of the software components, configuring hardware components to limit use of some or all functions of the hardware components, collecting data regarding the environment in which endpoint device 114 is positioned and reporting the data to orchestrator 120 or other management entities, initiating active disruption of other device operably connected to endpoint device 114 such as sending streams of corrupted or otherwise uninterpretable data, remapping human input devices to limit the ability of the human input devices (e.g., mouse, keyboard, etc.) to be used by users of endpoint device 114, and/or other types of actions that may dissuade a malicious actor from utilizing endpoint device 114.

Turning to FIG. 2C, a third interaction diagram in accordance with an embodiment is shown. The third interaction diagram may illustrate processes and interactions that may occur when an endpoint device is unable to authenticate a root of trust.

When a root of trust is unable to be verified (e.g., during startup or operation), security process 230 may be performed. During security process 230, any of the actions to dissuade a malicious actor from utilizing endpoint device 114 may be performed.

Additionally, various actions may be performed to limit functionalities of endpoint device 114 and/or initiate recovery of endpoint device 114. These actions may include sealing of endpoint device 114. Endpoint device 114 may be sealed by limiting access to secrets used in the operation of endpoint device 114. For example, the trusted platform module of endpoint device 114 may secure volume management keys that encrypt data stored by endpoint device 114. Without access to the volume management keys, the data stored in endpoint device 114 may not be decryptable.

The trusted platform module may be configured to measure whether the security data is available to endpoint device 114. If unavailable, the trusted platform module may disallow use of the volume management keys and/or other secrets maintained by endpoint device 114.

Additionally, to initiate recover of endpoint device 114, endpoint device 114 may send a notification to orchestrator 120 at interaction 232. The notification may indicate that endpoint device 114 is unable to validate its root of trust. Orchestrator 120 may respond to such messages by initiating performance of various actions to manage the operation of endpoint device 114. These actions may include scheduling maintenance for endpoint device 114, conducting a security review for endpoint device 114, etc.

To facilitate transmission of the notification, endpoint device 114 may be configured to establish network channel 286. Network channel 286 may be a communication channel that endpoint device 114 establishes via any open or otherwise available network. For example, endpoint device 114 may automatically attempt to connect to and utilize an available network to send the notification.

Thus, using the interactions and processes shown in FIGS. 2A-2C, an endpoint device may be less likely to be compromised by requiring that the endpoint device be within a certain distance of a security manager and have line of sight access to the security manager to support optical communications over which the security data is transmitted. Without this access, endpoint device 114 may automatically limit its functionality and/or initiate performance of actions to reduce the likelihood of being compromised.

As discussed above, the components of FIG. 1 may perform various methods to manage operation of endpoint devices through validation of roots of trust. FIG. 3 illustrates a method that may be performed by the components of the system of FIG. 1. In the diagram discussed below and shown in FIG. 3, any of the operations may be repeated, performed in different orders, and/or performed in parallel with or in a partially overlapping in time manner with other operations.

At operation 300, validation of a root of trust of an endpoint device may be initiated during a startup of the endpoint device. The validation may be initiated automatically during the startup. For example, a startup management entity such as a basic input output system (BIOS) may initiate the validation during the startup, a platform management module may initiate the validation by measuring registers in which measurements of various data structures are stored (e.g., such as by computing hashes of EFI databases), and/or via other methods.

At operation 302, during the validation, security data required to complete validation of the root of trust is identified. The identification may be made by reading information regarding the security data and/or associated with the security data from storage. For example, information regarding the security manager that stores the security data may be read from storage. The information may be used to identify how to obtain the security data from the security manager.

At operation 304, access to the security data is requested from the security manager. The request may be made via an optical wireless communication channel, such as a channel operating in accordance with LiFi communications. The request may be made, for example, by generating a data structure indicating that the access is requested, signing the data structure with a private key (the public key may be published and the security manager may have access to the public key), and sending the signed data structure to the security manager via the optical wireless communication channel. The optical wireless communication channel may also be encrypted with a session key established by the endpoint device and the security manager via any process.

The data structure may also include, for example, identification information for the endpoint device and/or other information usable by the security manager to validate that the endpoint device is to be provided with access to the security data.

If the security manager is able to validate that the endpoint device is to be provided with access to the security data, then the security manager may provide the security data. However, if the security manager is unable to validate that the endpoint device is to be provided with access, then access to the security data may be denied.

At operation 306, a determination is made regarding whether the security data was provided to the endpoint device. The determination may be made based on whether the security data was transmitted to the endpoint device via the optical wireless communication channel responsive to the previously made request in operation 304.

If the security data is provided, then the method may proceed to operation 308. Otherwise, the method may proceed to operation 310.

At operation 308, the validation of the root of trust is completed, and the startup is completed. The validation may be completed, for example, by using the security data to enable various data structures to be authenticated (e.g., to check signatures applied to data structures, check hashes of the data structures against known good hashes, etc.), for registers to be populated and used by the trusted platform module to determine the security posture of the endpoint device (e.g., lack of access to the security data may cause the trusted platform module to believe that the host endpoint device is compromised), etc.

If validated, then the security data and/or retained functionality of the endpoint device may be used to complete the startup. For example, various pieces of software that are validated using the security data, encrypted data may be decrypted using secrets maintained by the trusted platform module, and/or other verification actions may be performed to place the endpoint in condition to initiate execution of applications that provide desired computer implemented services.

The method may end following operation 308.

Returning to operation 306, the method may proceed to operation 310 if the security data is no provided by the security manager to the endpoint device.

At operation 310, at least one security action is performed to reduce the likelihood of the endpoint device being compromised. The security actions may include any of the security actions discussed with respect to FIGS. 2B-2C to reduce the likelihood of compromise of endpoint device 114.

In an embodiment, the at least one security action includes sealing at least a portion of the functionality of the endpoint device from future use by users of the endpoint device. The functionality may be accessing secrets previously used in the operation of the endpoint device. The functionality may be sealed by the trusted platform module of the endpoint device. While sealed, the trusted platform module may refuse requests to utilize secrets that it maintains.

For example, the trusted platform module may conclude that the endpoint device is in an unsecured state based on lack of access to the security data, and may automatically seal itself. Consequently, previously utilized secrets such as volume management keys may be unavailable for use by the endpoint device, and users thereof.

The method may end following operation 310.

Thus, using the method shown in FIG. 3, embodiments disclosed herein may reduce the likelihood of endpoint devices from being compromised by distributing portions of data required for validation of roots of trust of the endpoint devices to other devices. By distributing the information and only allowing the information to be distributed back to the endpoint devices via optical wireless communication channels, the endpoint devices may be required to be within physical proximity of the other devices. Accordingly, malicious physical activity such as removal of the endpoint device from an environment in which it is deployed may cause the endpoint device to enter a security state in which various functionalities are barred from use, the endpoint device may actively disrupt the operation of other devices, and/or other types of security actions may be performed.

Figure 4:
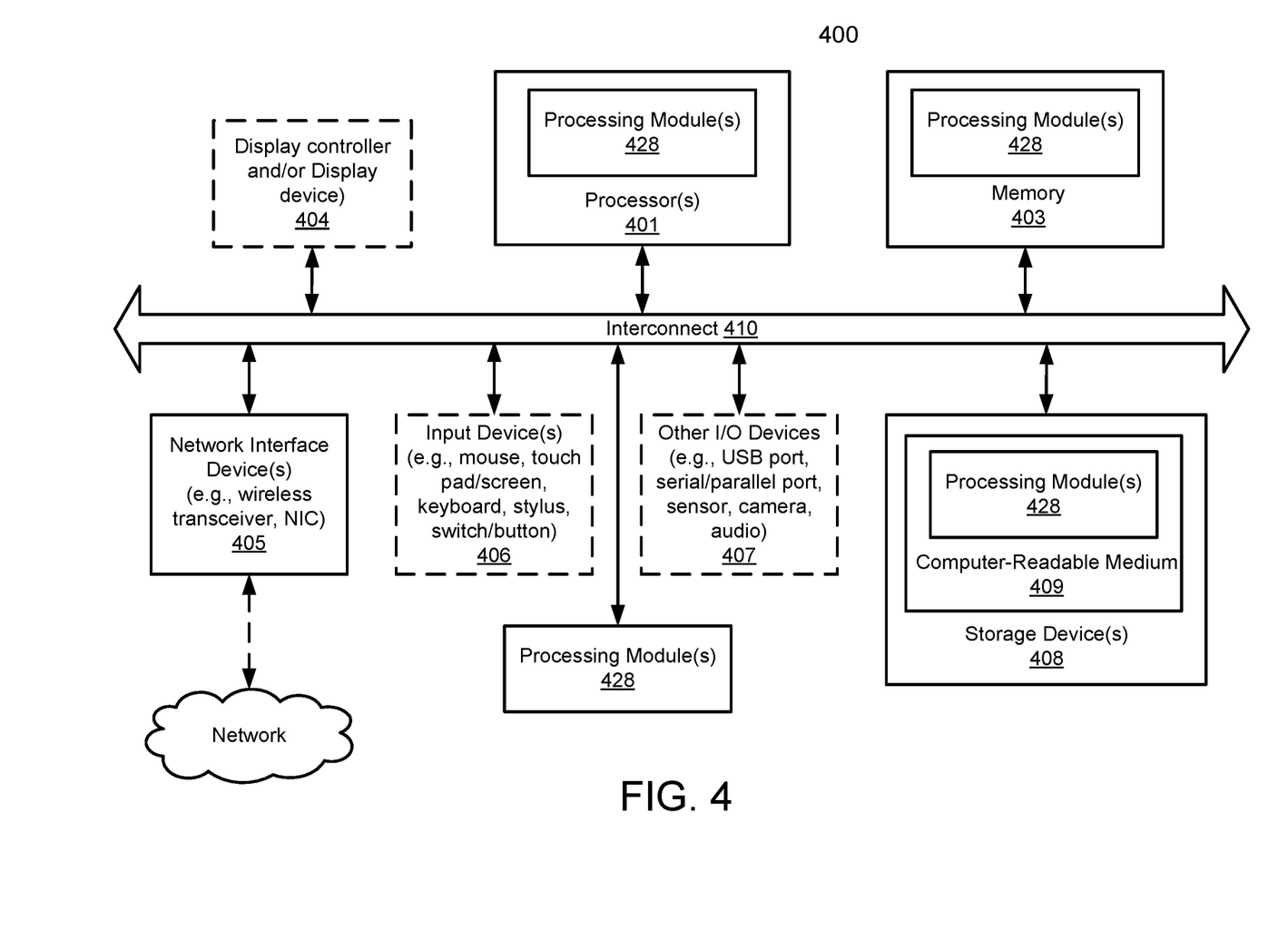
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of endpoint devices of a deployment, the method comprising:
   initiating validation of a root of trust during a startup of an endpoint device of the endpoint devices;
   during the validating of the root of trust, identifying security data required to complete the validating of the root of trust;
   requesting, via an optical wireless communication channel, that a security manager provide access to the security data;
   making a determination regarding whether the security data has been provided responsive to the requesting; and
   in a first instance of the determination where the security data has not been provided:
      sealing at least a portion of functionality of the endpoint device from future use by users of the endpoint device.

2. The method of claim 1, further comprising:
   in a second instance of the determination where the security data has been provided:
      completing validation of the root of trust to obtain a validated root of trust and completing the startup using the validated root of trust to maintain access to the at least the portion of the functionality of the endpoint device.

3. The method of claim 2, wherein the at least the portion of the functionality of the endpoint device is sealed by a trusted platform module of the endpoint device, the trusted platform module preventing use of at least one secret by the endpoint device while the at least a portion of the functionality is sealed.

4. The method of claim 1, wherein the security manager comprises a LiFi recorder adapted to communicate with the endpoint device while the endpoint device is within a distance to the security manager and the security manager has an unobstructed line of sight to the endpoint device.

5. The method of claim 4, wherein the optical wireless communication channel operably connects the LiFi recorder and the endpoint device while the endpoint device is within the distance to the security manager and the security manager has an unobstructed line of sight to the endpoint device.

6. The method of claim 1, wherein sealing the at least a portion of functionality of the endpoint device from future use by users of the endpoint device comprises:
   measuring, by a trusted platform module, a register in which the security data is to be stored when received from the security manager; and
   concluding, by the trusted platform module, that the endpoint device is in an unsecured state based on the measuring,
   wherein the trusted platform module enters a sealed state when the endpoint device is in the unsecured state.

7. The method of claim 6, wherein the security data comprises a signature verifiable using a key stored in a database protected by the trusted platform module.

8. A non-transitory machine-readable medium having instructions stored therein, which when executed by a processor, cause the processor to perform operations for managing operation of endpoint devices of a deployment, the operations comprising:
   initiating validation of a root of trust during a startup of an endpoint device of the endpoint devices;
   during the validating of the root of trust, identifying security data required to complete the validating of the root of trust;
   requesting, via an optical wireless communication channel, that a security manager provide access to the security data;
   making a determination regarding whether the security data has been provided responsive to the requesting; and
   in a first instance of the determination where the security data has not been provided:
      sealing at least a portion of functionality of the endpoint device from future use by users of the endpoint device.

9. The non-transitory machine-readable medium of claim 8, wherein the operations further comprise:
   in a second instance of the determination where the security data has been provided:
      completing validation of the root of trust to obtain a validated root of trust and completing the startup using the validated root of trust to maintain access to the at least the portion of the functionality of the endpoint device.

10. The non-transitory machine-readable medium of claim 9, wherein the at least the portion of the functionality of the endpoint device is sealed by a trusted platform module of the endpoint device, the trusted platform module preventing use of at least one secret by the endpoint device while the at least a portion of the functionality is sealed.

11. The non-transitory machine-readable medium of claim 8, wherein the security manager comprises a LiFi recorder adapted to communicate with the endpoint device while the endpoint device is within a distance to the security manager and the security manager has an unobstructed line of sight to the endpoint device.

12. The non-transitory machine-readable medium of claim 11, wherein the optical wireless communication channel operably connects the LiFi recorder and the endpoint device while the endpoint device is within the distance to the security manager and the security manager has an unobstructed line of sight to the endpoint device.

13. The non-transitory machine-readable medium of claim 8, wherein sealing the at least a portion of functionality of the endpoint device from future use by users of the endpoint device comprises:
   measuring, by a trusted platform module, a register in which the security data is to be stored when received from the security manager; and
   concluding, by the trusted platform module, that the endpoint device is in an unsecured state based on the measuring,
   wherein the trusted platform module enters a sealed state when the endpoint device is in the unsecured state.

14. The non-transitory machine-readable medium of claim 13, wherein the security data comprises a signature verifiable using a key stored in a database protected by the trusted platform module.

15. An endpoint device, comprising:
   a processor; and
   a memory coupled to the processor to store instructions, which when executed by the processor, cause the processor to perform operations for managing operation of the endpoint device as a member of endpoint devices of a deployment, the operations comprising:

initiating validation of a root of trust during a startup of an endpoint device of the endpoint devices;

during the validating of the root of trust, identifying security data required to complete the validating of the root of trust;

requesting, via an optical wireless communication channel, that a security manager provide access to the security data;

making a determination regarding whether the security data has been provided responsive to the requesting; and in a first instance of the determination where the security data has not been provided:

sealing at least a portion of functionality of the endpoint device from future use by users of the endpoint device.

16. The endpoint device of claim 15, wherein the operations further comprise:

in a second instance of the determination where the security data has been provided:

completing validation of the root of trust to obtain a validated root of trust and completing the startup using the validated root of trust to maintain access to the at least the portion of the functionality of the endpoint device.

17. The endpoint device of claim 16, wherein the at least the portion of the functionality of the endpoint device is sealed by a trusted platform module of the endpoint device, the trusted platform module preventing use of at least one secret by the endpoint device while the at least a portion of the functionality is sealed.

18. The endpoint device of claim 15, wherein the security manager comprises a LiFi recorder adapted to communicate with the endpoint device while the endpoint device is within a distance to the security manager and the security manager has an unobstructed line of sight to the endpoint device.

19. The endpoint device of claim 18, wherein the optical wireless communication channel operably connects the LiFi recorder and the endpoint device while the endpoint device is within the distance to the security manager and the security manager has an unobstructed line of sight to the endpoint device.

20. The endpoint device of claim 19, wherein sealing the at least a portion of functionality of the endpoint device from future use by users of the endpoint device comprises:

measuring, by a trusted platform module, a register in which the security data is to be stored when received from the security manager; and concluding, by the trusted platform module, that the endpoint device is in an unsecured state based on the measuring, wherein the trusted platform module enters a sealed state when the endpoint device is in the unsecured state.

* * * * *